United States Patent [19]

Webb

[11] 4,031,987

[45] June 28, 1977

[54] SPRING APPLIED, ELECTRICALLY RELEASED BRAKE WITH ADJUSTABLE THRUST ELEMENT

[75] Inventor: David John Webb, Bridgwater, England

[73] Assignee: Elliston, Evans and Jackson Limited, Bridgwater, England

[22] Filed: Oct. 24, 1975

[21] Appl. No.: 625,303

[30] Foreign Application Priority Data

Oct. 26, 1974 United Kingdom ............ 46422/74

[52] U.S. Cl. .................................. 188/75; 188/171
[51] Int. Cl.² ......................................... B60T 13/04
[58] Field of Search .............. 188/171, 173, 106 P, 188/75, 204 R, 196 V, 196 M, 79.5 R; 192/90

[56] References Cited

UNITED STATES PATENTS

| 891,632 | 6/1908 | Neehan | 188/171 X |
|---|---|---|---|
| 1,563,544 | 12/1925 | Atkinson | 188/171 |

FOREIGN PATENTS OR APPLICATIONS

| 1,047,157 | 12/1950 | France | 188/171 |
| 1,144,978 | 3/1963 | Germany | 188/171 |
| 1,199,551 | 8/1965 | Germany | 188/171 |
| 372,500 | 5/1932 | United Kingdom | 188/171 |

OTHER PUBLICATIONS

Article "Die neue Krupp–Ardelt Norm–Doppelbrekenbremse," published in *Technische Mitteilungen Krupp Werksberichte* 21, Nov., 1963, pp. 165–170.

*Primary Examiner*—Trygve M. Blix
*Assistant Examiner*—Douglas C. Butler
*Attorney, Agent, or Firm*—Merriam, Marshall, Shapiro & Klose

[57] ABSTRACT

An industrial brake for application to an electrically-driven shaft in the event of power supply shut-down. The braking thrust is infinitely adjustable within a predetermined range by screw adjustment of the angle between a pair of levers pivoted to a brake control member at a single pivot. The remote ends of the levers are pivoted to respective arms carrying brake shoes for application to the shaft. A coiled spring tends to pull the brake "on" but an electrically-controlled thrustor normally overcomes the spring force except when its power supply is shut-down.

1 Claim, 2 Drawing Figures

SPRING APPLIED, ELECTRICALLY RELEASED BRAKE WITH ADJUSTABLE THRUST ELEMENT

BACKGROUND OF THE INVENTION

1. Field of the Invention

This invention relates to an electrically controlled brake of the type which is intended to apply brakes to a shaft or other rotating part in the event of an electrical failure.

The invention is concerned with the type of electrically controlled brake in which two brake arms, each carrying a brake shoe are pivoted at respective ends to a fixed support, their other ends being pivotally secured to a brake control assembly which normally holds the brake "off" but which, on cessation of the electrical supply thereto, moves the brake arms to a position where the brake shoes are firmly held "on". The brake includes a strong spring biasing means which tends to pull the brake on but which is normally overcome by an electro-hydraulic or electromagnetic thrustor, provided that the electrical supply to the thrustor is maintained to hold the brake off. When the supply ceases the spring means apply the brake.

An arrangement as above described is hereinafter referred to as "an electrically controlled brake of the type specified".

2. Description of Prior Art

In order to obtain a standard form of such brake to be adapted for various thrusts and therefore for various braking applications, there have been proposals for obtaining a number of different lever ratios and thus braking thrusts from the brake control assembly.

SUMMARY OF THE INVENTION

It is an object of the present invention to provide an improved arrangement whereby the brake control assembly lever ratio and thus the braking thrust may be adjusted rapidly and simply without having to disassemble any parts of the brake itself.

According to the invention there is provided an electrically controlled brake of the type specified in which the brake control assembly comprises a brake control member pivotally secured at spaced positions to a thrustor device and to a spring biasing means respectively, first and second levers pivotally connected at one pair of ends to respective brake arms, the other ends of the first and second levers being pivotally connected together and to said brake control member at a single pivot point associated with the spring biasing means, the first and second levers also being connected together by an adjusting device which can be lengthened or shortened to vary the angular separation between the levers without varying the length of the levers and which can be set to hold the two levers fixed at a desired angle relative to each other according to the braking thrust required.

The adjusting device may comprise an adjusting screw rotatably mounted in one of said first and second levers but held captive against axial movement, the adjusting screw having a screw threaded engagement with a pin rotatably mounted in the other lever, whereby rotation of the adjusting screw causes lengthening or shortening of the adjustment device to vary the angle between the levers.

BRIEF DESCRIPTION OF THE DRAWINGS

The invention will now be described in more detail by way of example only with reference to the accompanying drawings in which.

DETAILED DESCRIPTION OF THE PREFERRED EMBODIMENT

Figure 1:
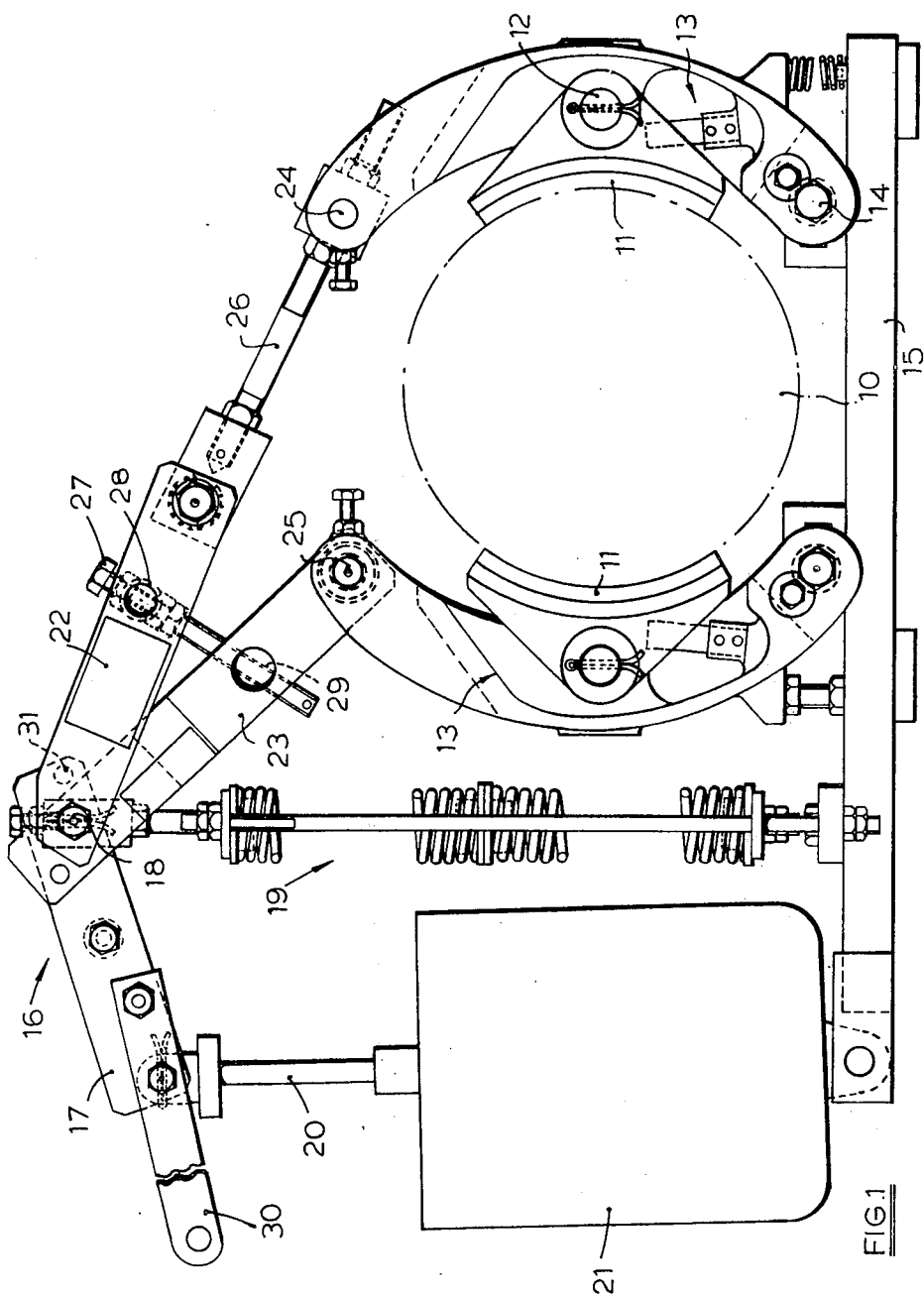
FIG. 1 is an elevational view of a brake embodying the invention.

Referring firstly to FIG. 1, the brake is intended to operate on a shaft shown in chain dotted outline at 10. The shaft may be driven by an electric motor or the like and should be stopped from rotation if the electrical power supply is cut-off.

A pair of brake shoes 11 are disposed so as to be slightly spaced from the shaft 10 in the normal off condition of the brake but these shoes 11 can be urged inwardly against the shaft surface to give friction braking when the brake is in an on condition.

Each brake shoe 11 is pivotally mounted at 12 on an arcuate brake arm generally indicated at 13, the lower end of which is pivoted at 14 to a fixed base plate 15.

The upper ends of the brake arms 13 are pivotally attached to a brake control assembly generally indicated at 16 which includes a brake control member 17 pivoted at its one end 18 to a biasing spring arrangement generally indicated at 19 which tends to urge the pivot point 18 downwardly. The brake control member 17 is held up by the piston 20 of a thrustor device 21 which may be electro-magnetically or electro-pneumatically operated for example. The thrustor device maintains an upward thrust on the rod 20 unless the electric current which supplies it is cut-off, whereupon the thrust ceases and the biasing spring arrangement 19 is no longer overcome and can act to apply the brake shoes 11 to the shaft 10.

At the pivot point 18 where the brake control member 17 is pivoted to the spring arrangement 19, a pair of levers 22, 23 are also pivoted. The remote ends of the levers 22 and 23 are pivotally secured at 24 and 25 to the upper free ends of the brake arms 13. An adjustment rod 26 is incorporated in the arm 22 to enable the arm to be preset to the correct length prior to use but this adjustment rod is not operated during use of the brake.

When the thrustor device 21 ceases to operate, the spring arrangement 19 pulls the pivot point 18 downwardly and, because of the position of the pivots 24 and 25 of the arms 22 and 23, both brake arms 13 are swung inwardly towards the shaft so as to bring the brake shoes 11 into contact therewith.

The strength of the braking action depends on the exact geometrical configuration of the arms 22 and 23. An adjustment device is provided to enable the lever ratio of the brake control lever assembly 16 to be adjusted within a relatively large range so that the effective braking achieved can be controlled to suit the particular type of shaft 10. The adjustment of the lever ratio is stepless and is achieved by means of an adjusting bolt 27 disposed between the levers 22 and 23. One end of the bolt 27 is axially fixed, although pivotally movable, at 28, whilst the other end of the bolt has screw-threaded engagement at 29 with a member associated with the lever 23. Thus, rotation of the bolt 27 either lengthens or shortens the effective distance between the pivot points 28 and 29 and hence adjusts the angle between the levers 22 and 23.

Hence, by suitably adjusting the bolt 27, the lever ratio of the brake control lever assembly can be adjusted steplessly within fairly widely spaced limits and hence the braking torque which can be achieved by the brake can be set to the desired value. Furthermore, no disconnection of the parts is necessary to adjust the lever ratio.

Figure 2:
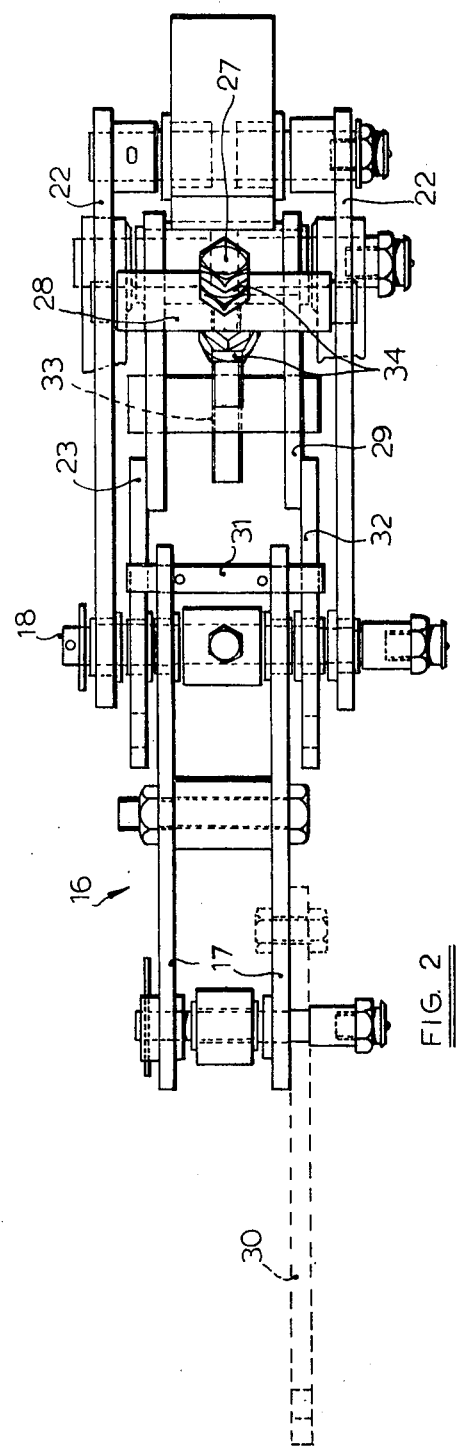
FIG. 2 is a plan view of the brake control assembly of the brake shown in FIG. 1, drawn to a different scale.

The above description is somewhat simplified in order to make description of the operation of the brake clearer. The plan view, FIG. 2, shows the detailed arrangement of the brake control lever assembly 16 more clearly.

The brake control member 17 in fact comprises a pair of spaced apart members as shown, one of which may have an extension 30 which is manually engageable. The pivotal axis 18 can be seen in FIG. 2 and it will also be seen that the spaced links 17 carry a transverse pin 31 which bears on the upper surface of the lower lever 23. The lower lever 23 is also in the form of a pair of spaced parallel plates or links which are provided with extensions 32. A rotatable pin 29 passes through the extensions 32 of the lower lever and has a threaded transverse bore 33 which receives the end portion of the adjustment screw 27. The screw 27 also passes through a transverse pin 28 which is pivotally secured between the two plates which form the upper lever 22. A set of nuts 34 is used to secure the bolt 27 against axial movement relative to the pin 28 so that, although the screw 27 can be rotated and has threaded engagement with the bore 33, the upper end portion of the screw is axially fixed relative to the pivotable pin 28. Consequently, rotation of the screw either lengthens or shortens the distance between the pins 28 and 29 and hence alters the angle between the upper and lower levers 22 and 23.

In some respects the construction of the electrically controlled brake shown in the drawings is similar to that disclosed in our prior British Patent Specification No. 1,203,791 to which reference may be had for additional details.

It will be seen that the invention provides a means for readily altering the lever ratio of the brake control lever assembly 16 by adjustment only of the angle between the upper and lower levers 22 and 23, without alteration of the length of these levers being necessary and without the need to disconnect any part of the brake assembly to perform such adjustment. The adjustment is completely stepless within its entire range and enables the lever ratio to be infinitely variable in contrast to prior suggested arrangements which have only enabled the selection of one particular lever ratio from a small number of discrete values, and which have therefore been of limited usefulness.

I claim:

1. An electrically controlled brake comprising a fixed support, two brake arms each having upper and lower ends and each carrying a respective brake shoe, the lower ends of said brake arms being pivoted to the support, a brake control assembly comprising a brake control member pivotally secured at spaced positions to an electrically controlled thrustor and to a spring biasing means respectively, the thrustor and biasing means tending to move the brake control member in opposed directions and the thrustor being capable, in use, of overcoming the biasing force of said biasing means, first and second levers each having a pair of ends, one end of each lever being pivotally connected to an upper end of a respective one of said brake arms, and the other ends of said levers being pivotally connected together and to said brake control member at a single pivot point, the spring biasing means also being connected to said pivot point, an adjusting device capable of being steplessly lengthened and shortened connecting together said first and second levers at an intermediate position disposed between the ends of said levers, said adjusting device comprising an adjusting screw rotatably mounted in one of said levers but held captive against axial movement, the other of said levers having a transverse pin rotatably mounted therein, and the adjusting screw having screw-threaded engagement within said pin and transversely thereof, whereby rotation of the adjusting screw to adjust the length of the adjusting device varies the angle between said first and second levers only, without varying the length of the levers.

* * * * *